United States Patent
Schaefer

(10) Patent No.: US 6,733,877 B2
(45) Date of Patent: May 11, 2004

(54) FULL GRAIN NAPA COWHIDE AND DRESSED LEATHER PRODUCTION METHOD

(76) Inventor: Philipp Schaefer, Am Leinewehr 25, D-30519 Hannover (DE)

( * ) Notice: Subject to any disclaimer, the term of this patent is extended or adjusted under 35 U.S.C. 154(b) by 0 days.

(21) Appl. No.: 10/264,872

(22) Filed: Oct. 4, 2002

(65) Prior Publication Data
US 2003/0068452 A1 Apr. 10, 2003

(30) Foreign Application Priority Data
Oct. 4, 2001 (AT) ........................... 762/2001 U

(51) Int. Cl.$^7$ ................................. B32B 5/18
(52) U.S. Cl. ............... 428/327; 428/305.5; 428/314.8; 428/318.6; 428/319.3; 428/403; 428/423.4; 428/423.3; 428/473
(58) Field of Search ............... 428/15, 305.5, 428/314.8, 319.3, 318.6, 327, 403, 423.4, 423.3, 473

(56) References Cited

U.S. PATENT DOCUMENTS 4,016,326 A    4/1977    Schaefer
4,751,116 A    6/1988    Schaefer
4,923,732 A    5/1990    Schaefer

FOREIGN PATENT DOCUMENTS

DE    24 45 605 C3    10/1975
EP    0 331 214 A2    9/1989
JP    01 104 634    4/1989

Primary Examiner—Alexander S. Thomas
(74) Attorney, Agent, or Firm—Laurence A. Greenberg; Werner H. Stemer; Ralph E. Locher

(57) ABSTRACT

In order to create a full grain napa cowhide which exhibits the characteristics with respect to grain pipeyness and water vapor permeability that are required by the automotive and upholstery industries, a finish is applied to the grain side of the full grain leather. The finish includes a pigmented layer with a thickness of between 0.015 mm and 0.04 mm and is formed of a stabilized polyurethane and/or polyacrylate dispersion. The dispersion contains microspheres with a diameter of less than 45 μm, which form primarily closed cells, and at least 10% open cells by volume. The top side of the layer is provided with a napa embossing. A second layer, placed on the first layer, is formed from a cross-linked polyurethane-based varnish application containing a dulling agent. The leather undergoes a milling treatment.

39 Claims, 1 Drawing Sheet

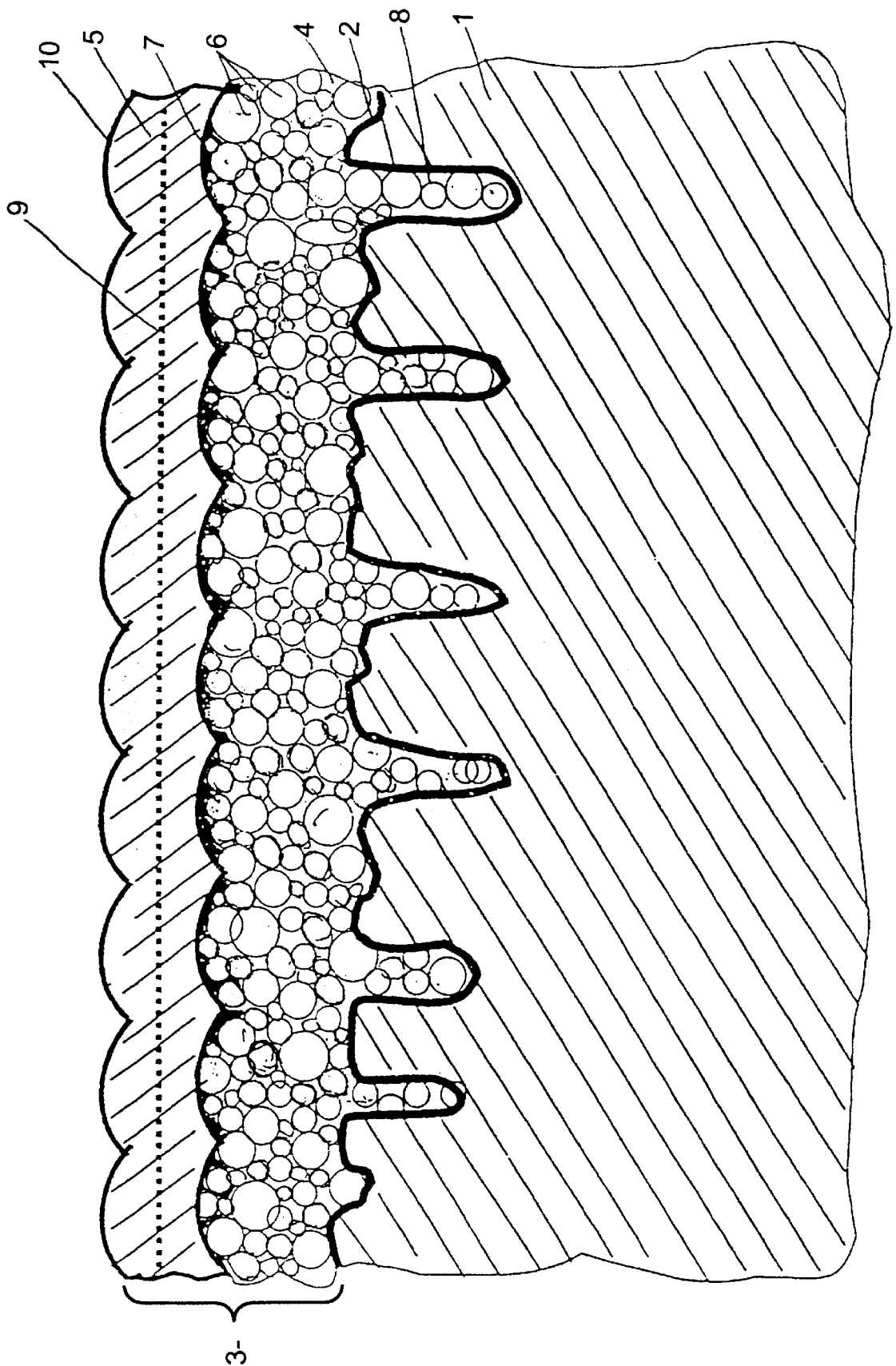

FULL GRAIN NAPA COWHIDE AND DRESSED LEATHER PRODUCTION METHOD

BACKGROUND OF THE INVENTION

Field of the Invention

The invention lies in the field of leather processing. More specifically, the invention relates to a full grain napa cowhide, one side of which is provided with a finish that partially comprises a foam structure formed from a stabilized polyurethane dispersion containing hollow microspheres. The invention furthermore relates to a method for fabricating such leather.

Such leathers are already known. German patent DE 24 45 605 C3 and the corresponding U.S. Pat. No. 4,016,326 (Schäfer), for example, disclose a leather for producing shoes, cushion covers, or the like, which is provided with a porous elastomer coating that contains microspheres whose shell consists of polyvinylidene chloride copolymerisate or polyvinyl chloride copolymerisate and contains an interior gas. The surface of the coating that is averted from the leather can be additionally provided with a finish.

U.S. Pat. No. 4,751,116 (Schäfer et al.) discloses the application of a coating consisting of two layers on the fibrous surface of split leather. The layer facing the surface of the split leather is formed by a stabilized polyurethane dispersion containing hollow microspheres. The surface of the coating that is averted from the split leather can be additionally provided with a finish.

U.S. Pat. No. 4,923,732 (Schäfer) likewise describes a split leather which is provided with a coating of two layers on its fibrous side. The layer facing the split leather includes hollow microspheres.

In the automotive industry and in the fabrication of high-quality upholstered furniture, as well as for shoe upper material, full grain cowhide is used, which has the necessary characteristics and which can have only a very thin finish in order to be classified as real full grain cowhide. The leather must exhibit the requisite elasticity and have a softness grade of at least 4, preferably better than 4.5, so that on one hand it can be formed into the required shape, and on the other hand, it guarantees a pleasant sitting sensation and a pleasant reaction to touch.

The softness grade is measured with a softness tester BLC ST300 according to IUP36 given a ring diameter of 25 mm. Such softness is achieved by extra long milling (fulling) of the leather skins. But in the process loose grains emerge on large parts of the leather skin equaling between 25% and 40% of the overall surface of the skin, for instance in the stomach region. This area is unsuitable for processing the leather for high-quality auto interiors such as seats or for upholstered furniture or high-quality shoes; therefore, a large amount of expensive leather skin is wasted by extended milling. Another disadvantage of using the known leathers which are provided with a finish is that they are insufficiently breathable, if at all.

It has therefore been proposed that a plastic material that has been foamed by stirring in air be applied on the grain side of the leather and covered after being stabilized by a varnish layer which undergoes embossing in order to form a grainy surface. But the foam material is pressed together in the region of the grain valleys, so that the softness and elasticity which is produced by the foam is lost there. The foam layer thus has different thicknesses; namely, it has a lower thickness on the peaks of the grains, which are more heavily worn with use, which is disadvantageous for later utilization. Besides this, with this known configuration the danger exists that the grain structure may be lost when the leather is stretched over edges or curves or the like owing to the pliability of the foam layer, above all under the influence of heat.

SUMMARY OF THE INVENTION

It is accordingly an object of the invention to provide a full grain napa cowhide leather and an associated production method which overcome the above-mentioned disadvantages of the heretofore-known devices and methods of this general type and which further improve a fully grained napa cowhide such that it has the characteristics required in the automotive and upholstery industries and above all has no notable grain pipeyness after the required milling and does not lose its grain stability even with expansion, and which has the required permeability to water vapor. In particular, the inventive leather should be breathable, wearproof even with respect to its color, lightproof, hydrolysis resistant, and scratchproof. The leather must also be fogless and have low perspiration, so that when it is utilized for auto furnishings the inside of the windshield does not steam up. Also, above all, no toxic gases must be released. The surface of the leather must also be resistant to certain chemicals as well as water, and the leather surface which is provided with the graining should not change disadvantageously when applied over base materials, for instance when the leather is stretched around curves or edges.

With the foregoing and other objects in view there is provided, in accordance with the invention, a dressed leather product, comprising:

full grain cowhide having a grain side;
a finish provided on the grain side, the finish including:
  a first layer with a thickness of between 0.015 mm and 0.04 mm applied on the grain side of the cowhide and formed of a stabilized dispersion of at least one material selected from the group consisting of polyurethane and polyacrylate and having a primary proportion of hollow microspheres with a diameter of less than 45 $\mu$m forming closed cells and a proportion of at least 10% by volume of open cells; the first layer having an embossed top surface; and
  a second layer disposed on the first layer and formed from a cross-linked polyurethane-based varnish application containing a dulling agent;
and wherein the leather product undergoes a milling treatment.

In accordance with an added feature of the invention, the first layer is a pigmented layer, the microspheres have a diameter of substantially between 15 $\mu$m and 35 $\mu$m, and the second layer is a multi-coating layer.

With the above and other objects in view there is also provided, in accordance with the invention, a method of producing a full grain napa cowhide. The method comprises:

providing cowhide material having a grain side;
providing a first dispersion based on at least one material selected from the group consisting of polyurethane and polyacrylate, the dispersion containing at least one of hollow microspheres with a diameter between 15 $\mu$m and 45 $\mu$m and compact particles from which the microspheres are formed in situ by heat addition, the microspheres having a thin shell of polyvinylidene chloride and polyacrylnitrile containing a heavy gas;
applying the first dispersion on the grain side of the cowhide, and thereby selecting a quantity of the dispersion such that, after the dispersion is stabilized by dehydration, a first layer with a thickness between 0.015 mm and 0.04 mm is formed, the first layer comprising primarily closed cells formed by the microspheres and at least 10% open cells by volume;

embossing the stabilized first layer with one of pressure and heat processing;

applying a cross-linkable polyurethane dispersion on the first layer to form a second layer; and subjecting the leather to a milling treatment.

The term full grain napa cowhide refers to a leather which acquires its softness by extended milling, during which the milled napa surface structure with the characteristic "milling grain" develops. This type of leather can only be produced inadequately by known techniques if at all.

According to the invention, the object is achieved in that the finish consists of a first, preferably pigmented layer with a thickness between 0.015 mm and 0.04 mm on the grain side of the full grain napa cowhide—which consists of a stabilized dispersion containing polyurethane and/or polyacrylate and comprising primarily hollow microspheres with a diameter of less than 45 $\mu$m (preferably between 15 $\mu$m and 35 $\mu$m) forming closed cells but also a portion of at least 10% by volume of open cells, and comprising an embossing on its top surface—and a second, potentially multi-coating layer on this first layer, which is formed from a cross-linked varnish application containing a dulling agent; and in that the leather undergoes a milling treatment. The second layer consists of a stabilized diluted polyurethane varnish application.

According to a separate feature of the invention, the hollow microspheres have a thin shell which consists of at least 75% polyvinylidene chloride and less than 25% polyacrylnitrile, and they contain a heavy gas, preferably isobutane, in their interior.

The interspaces between the hollow microspheres form the open cells which are needed for the water vapor permeability and breathability. These open cells can be further multiplied by inventively opening the thin shells of individual hollow microspheres by mechanical and/or chemical means, so that individual hollow microspheres thereby also form open cells. To accomplish this, the second layer can inventively contain a solvent such as ethylacetate or methylethylketone which partly dissolves the thin shell of individual hollow microspheres. Individual microspheres can also be opened mechanically, for instance by inserting needles into their shells.

The inventive leather is thus provided with a finish whose first layer, namely the foam-like pigmented layer, comprises hollow microspheres with a small diameter which are arranged closely adjacent one another and which brace against one another, preventing bursting of the thin shells under stress and escaping of the gas. This layer thus has a constant thickness at all points. It has been shown that even in eight hours of milling the closed cells formed by the microspheres are not destroyed, and hardly any gas escapes. Because the contact between the individual spheres is substantially only point-to-point, cavities emerge, which form open cells in this first layer which ensure the required water vapor permeability and breathability, the number of which can be further increased if necessary by opening the shells of individual microspheres as described.

The second layer, a varnish layer containing a dulling agent, advantageously comprises a thickness between 0.02 mm and 0.05 mm and is therefore thin enough that the water vapor permeability is not adversely affected by this second layer. This second layer fills the micropores at the surface of the first layer but without penetrating into this layer, so that on one hand an inseparable anchoring between the two layers is guaranteed, and on the other hand a compromising of the elastic characteristics of the first layer is avoided.

The inventive leather has a water vapor permeability of more than 0.6 mg/cm$^2$×h, preferably of greater than 1.0 mg/cm$^2$×h and a softness grade of at least 4.5 as a result of milling, without large areas becoming pipey. The softness grade is measured as mentioned above in the foregoing description. The thickness of the inventive napa cowhide equals between 1.0 mm and 1.4 mm.

It has proven advantageous for at least one of the layers to contain a fine wood flour in a quantity between 0.5% and 9% by volume (vol %), preferably in a quantity between 1.5% and 7%. The water vapor permeability of the finish can thus be improved, that is to say modified by varying this quantity and thereby adapted to the respective requirements.

It is particularly advantageous when the leather has the shape of a format cut prior to the applicant of the layers, i.e. when smaller portions corresponding to the utilization of the leather are cut out of a large leather skin before the finish is applied. That way, the different textures of a whole animal skin of 50 m$^2$ which has different thicknesses in individual regions can be better accounted for. The skin is less thick in the periphery of a whole animal skin, and therefore a lower pressure can be used for the embossing, whereas the thickness is greater in the interior region of the skin.

Furthermore, smaller embossing rolls can be used for embossing format cuts, which substantially reduces the costs of acquiring these rolls, namely because the dimensioning and bearing for embossing rolls with a length of 3 meters, for example, such as those used for embossing a whole animal skin, have to be designed substantially stronger than for small embossing rolls with a length of 80 cm, for example, such as those used for format cuts.

The inventive method for producing the full grain napa cowhide is as follows: a polyurethane and/or polyacrylate based dispersion which preferably contains a pigment is applied on the grain side of the cowhide. The dispersion contains hollow microspheres with a diameter between 15 $\mu$m and 45 $\mu$m and/or compact particles from which such microspheres are formed in situ by the addition of heat. The microspheres have a thin shell consisting of polyvinylidene chloride and polyacrylnitrile which contains a heavy gas, preferably isobutane. The quantity of the dispersion is selected such that, after it is stabilized by dehydration, a first layer with a thickness between 0.015 mm and 0.04 mm is formed, which comprises primarily closed cells consisting of the microspheres but also at least 10% open cells by volume. The stabilized first layer is embossed by means of pressure and/or heat. A cross-linkable polyurethane dispersion, preferably containing a dulling agent, is applied thereon, preferably in several successive coatings, forming a second varnish layer The leather undergoes a milling treatment.

With the embossing of the first layer with the aid of pressure and heat, the shells of some of the microspheres are ruptured given an embossing temperature below 120° C. as a consequence of the low distortion temperature of the microspheres, whose shell consists of at least 75% polyvinylidene chloride, and these form additional open cells, which enhance the breathability. At the same time, an inseparable anchoring to the full grain cowhide is guaranteed.

In order to destroy the shells of individual microspheres and thereby increase the number of open cells, the thin shells of individual microspheres can also be inventively dissolved by a solvent. Suitable solvents are ethylacetate or methylethylketone contained in the second layer. A mechanical destruction of the shells of individual microspheres is also possible, namely by producing holes in the first layer by inserting needles or the like, potentially during the embossing, whereby the thin shells of individual microspheres are opened. The insertion can be performed by means of a needle board or roller, and the needles can be cold or warm. After the needles are removed, the holes close owing to the elastic material of which the first layer consists, but the opened microspheres and the open cells they form remain intact.

When silicon dioxide, preferably in a particle size between 2 $\mu$m and 4 $\mu$m, is utilized as the dulling agent, the shells of individual microspheres can be opened by the action of this dulling agent.

The embossing expediently occurs with the aid of an embossing roll with a temperature between 80° C. and 120° C., whereby the thermal contact between the embossing roll and the first layer lasts less than 2 seconds. The surface of the embossing roll comprises depressions corresponding to the napa grain structure that is to be produced, into which portions of the first layer penetrate (by foaming) during embossing, so that the desired napa graining emerges.

The varnish application which is applied after the embossing can be performed in several steps, for instance by successive spraying onto the stabilized first layer and effectuates the desired color tone of the leather given corresponding dulling and pigmentation.

Besides the napa embossing, in order to achieve the typical soft fulled napa effect and to get the required softness grade above 4.5, the leather is inventively subjected to milling treatment for a period of at least two hours, preferably between 8 and 12 hours. This milling treatment can occur after the first layer is stabilized already, or not until the second layer is stabilized. It is also possible to perform part of the milling after the stabilizing of the first layer, and the rest after the stabilizing of the second varnish layer.

When the varnish layer consists of several coatings, it is also possible to perform the embossing after the first coating is applied but before the last coating is applied.

The effect of the closed cells that are formed by the hollow microspheres is that the inventive soft fulled napa leathers are only slightly pipey, if at all, and they have a high grain stability, and so the usable area of an inventive leather skin is some 50% higher than that of the known napa cowhides. The open cells guarantee the required water vapor permeability. Furthermore, open cells can be achieved by introducing air into the first layer. It has been shown that the water vapor permeability is already more than 0.6 mg/cm$^2$·h given a 10% share of open cells by volume.

The water vapor permeability can be further improved (i.e. controlled) by admixing fine wood flour in a quantity between 0.5% and 9% by volume (preferably in a quantity between 1.5% and 7% by volume) with at least one dispersion which forms one of the two layers prior to application. The water vapor permeability can be adapted to the respective requirements by varying the amount. Thus, the disadvantageous perforating of the finished leather in the seat area of a car seat can be avoided by adding a corresponding quantity of wood flour.

Particularly when the leather will be under high stress, as with seats in public transportation, it is advantageous to subject the grain side of the cowhide to a pretreatment before the dispersion that forms the first layer is applied, by means of which the finish can be more effectively joined to the grain side of the leather. This type of pretreatment can be performed by roughening the grain side of the cowhide, preferably by abrasion. Gentle grinding with an extra-fine abrasive paper substantially improves the adhesive force, while the grain structure of the leather remains at least 90% intact.

But this can also be achieved by singeing (flame-treating) the grain side of the cowhide prior to the application of the finish. It has been discovered that this singeing produces radicals more or less in the surface, which also substantially improves the adhesion of the finish. The best flame for this is one like a soldering flame which heats the grain layer only superficially to over 160° C., whereby the temperature does not rise above 110° C. in the middle and on the bottom side of the leather. This treatment of the leather does not change the appearance of the grain side.

Format portions are expediently removed from a cowhide skin prior to the application of the dispersion forming the finish. That way, not only is it possible to account for the different textures of the skin in the individual regions equally and thereby guarantee the utilization of the whole skin as described above, but it is also possible to easily change the composition and texture of the finish according to requirements. For instance, the individual format portions can be designed in such a way that one portion of the finish is softer and another is harder, or such that the portions of the finish are different colors. This can be achieved easily by controlling the application of the dispersion that forms the finish by means of a storage medium such as a CD-ROM, diskette, or memory chip. Another advantage of using such format portions is that cheaper spraying systems and finer spray nozzles can be utilized for applying the dispersion forming the individual layers, and so less overspray is needed and less waste is produced.

Other features which are considered as characteristic for the invention are set forth in the appended claims.

Although the invention is illustrated and described herein as embodied in a full grain napa cowhide and a related production method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole drawing FIGURE represents a section through a The leather according to the invention in an approximately 500× enlargement.

DESCRIPTION OF THE PREFERRED EMBODIMENTS

Referring now to the FIGURE of the drawing in detail, there is shown a full grain cowhide 1 which has been only slightly ground on the grain side, if at all, for instance having been mechanically processed with extra-fine grinding or polishing paper or pretreated by singeing with the aid of a blowtorch for the purpose of improving the adhesion of the finish. The grain side 2 is provided with a finish 3, which includes two layers 4, 5. The layer 4 which is joined to the grain side 2 comprises a stabilized pigmented dispersion containing polyurethane and/or polyacrylate and contains hollow microspheres 6 whose thin shell is formed from polyvinylidene chloride or polyacrylnitrile. The microspheres 6 contain a heavy gas such as isobutane in their interior. The hollow microspheres 6 have a diameter between 15 µm and 45 µm; they are thus small and closely adjoin one another, so that the first layer 4 has a substantially closed-cell foam structure. In this configuration, the microspheres brace against one another, which prevents bursting of the thin shell and escaping of the gas from the microspheres given stress, even when the inventive leather is lined on a backing, that is to say bent over edges, corners and the like. The first layer 4 thus has a foam structure with a uniform thickness everywhere, which is not compromised even by stresses.

But small cavities emerge between the microspheres as a result of the spherical shape and the resulting substantially point-to-point contact of neighboring microspheres. The cavities form open cells which guarantee the required water vapor permeability of more than 0.6 mg/cm$^2 \cdot$h.

The first layer 4 thus comprises a microporous foam structure which is generated and maintained by less than 1 g isobutane gas per m$^2$ and which is flexible under pressure. It has been proven in a test of long-term bending behavior that after 100,000 bucklings the closed cells which are formed by the microspheres remain intact even in the bending zone and do not lose their compression flexibility.

The layer 4 is formed by applying the dispersion containing polyurethane and/or polyacrylate on the grain side 2 and allowing it to stabilize by dehydration. It is not absolutely necessary to add heat in order to accomplish this, because the hygroscopic leather 1 absorbs a majority of the water that is contained in the dispersion. The hollow microspheres are either admixed with the dispersion in the required amount or formed in situ from compact particles by the addition of heat. The pigment proportion advantageously consists of at least 75% polyvinylidene chloride. This heat addition can be performed simultaneously with the required embossing of the top side 7 of the layer 4 so that this top side acquires the desired napa grain structure. The embossing is preferably done by means of embossing rolls which have an embossing on their surface corresponding to the napa grain structure that is to be produced, and which are heated to a temperature between 80° C. and 120° C. The leather itself is barely condensed or hardened by the relatively low embossing pressure of less than 125 kg/cm$^2$, preferably less than 90 kg/cm$^2$, which lasts less than two seconds. Given an embossing temperature of some 85° C., the microspheres which are formed from the compact particles consisting of at least 75% polyvinylidene chloride also fill what are known as the hair cells with excess pressure, thereby reducing the grain pipeyness.

The top side 7 of the first layer 4 is covered by the second layer 5, which is between 0.02 and 0.05 mm thick and which can emerge from several coatings which are applied on one another by spraying, for example, as indicated by the dividing line 9. The second layer 5 is between 0.02 mm and 0.05 mm thick—that is to say very thin, for which reason the water vapor permeability is only negligibly compromised by this layer containing a dulling agent—and consists of an aliphatic polyurethane or contains at least aliphatic crosslinked polyurethane on an ester base. It can also consist of a stabilized solution or stabilized dispersion and can comprise pigments by which the desired coloring of the leather is achieved. With the application of this second layer 5, the material in the open pores on the top side 7 of the first layer 4 is anchored but without penetrating this first layer 4, which guarantees a good joint between the two layers 4, 5, on one hand, and does not adversely affect the characteristics of the porous layer 4 on the other hand. The structure of the top side 7 of the first layer 4 is reproduced on the top side 10 of the second layer 5, so that the desired grain structure emerges on the visible side of the leather.

Fine wood flour can be admixed with one or both of the solutions or dispersions forming the two layers 4, 5, whereby the water vapor permeability of the finish is improved. The water vapor permeability can be modified and thus adapted to requirements by varying the quantity of added wood flour.

It is advantageous to apply the dispersion or solution forming the finish on format portions which are removed from a whole leather skin, for instance by stamping or cutting. That way, the texture of the finish can be adapted to the later use of these format portions. Furthermore, the devices for applying the dispersion or solution that forms the finish and also for exerting the necessary pressure for the embossing are substantially simpler and cheaper.

The inventive leather must be milled or fulled for between two and twelve hours in order for the required softness to be guaranteed. This milling can be performed in one process either after the stabilizing of the first layer 4 or after the stabilizing of the second layer 5. But it is also possible to perform part of the milling after the stabilizing of the first layer 4 and the rest after the stabilizing of the varnish layer 5. Particularly beautiful soft and minimally pipey milled napa leathers are achieved by milling for a period of two to four hours subsequent to the embossing of the first layer 4, then applying the second layer 5 and milling for another two to four hours.

In order to increase the number of open cells, which are important for water vapor permeability, between the closed cells that are formed by the hollow microspheres, the shells of individual microspheres can be opened. This can occur either chemically by the action of a solvent that is admixed with the second layer 5, or by sticking needles into the first layer 4, which destroy individual shells of the microspheres. An additional increasing of the open cells can be achieved by stirring air into the dispersion which forms the first layer 4 before it is applied.

The surface of the varnish layer can potentially comprise a very thin terminal finish layer consisting of a polyamide or copolyamide.

In order to determine the thickness of the overall finish 3, this is removed from the grain side 2 with the aid of a solvent such as ethylacetate. The thickness is determined by means of a measuring disk with a diameter of 10 mm given a pressure of 2 N. This technique guarantees that unevennesses which emerge owing to the presence of peaks and valleys in the grain are evened out.

Owing to the microscopic fine structure of the foam layer 4, particularly when the varnish layer 5 is less than 0.03 mm thick, the inventive leather feels very pleasant to the touch and looks uniformly fine and full grain over the whole surface. The varnish layer determines the degree of dullness and gloss.

Besides the improvement of the grain pipeyness and-grain stability, a great advantage of the invention is that small surface flaws of the skin are covered without the water vapor permeability and softness grade being affected, so that the utilization of the skin surface can also be improved on this basis.

I claim:
1. A dressed leather product, comprising:
   full grain cowhide having a grain side;
   a finish provided on said grain side, said finish including:

a first layer with a thickness of between 0.015 mm and 0.04 mm applied on said grain side of said cowhide and formed of a stabilized dispersion of at least one material selected from the group consisting of polyurethane and polyacrylate and having a primary proportion of hollow microspheres with a diameter of less than 45 μm forming closed cells and a proportion of at least 10% by volume of open cells; said first layer having an embossed top surface; and a second layer disposed on said first layer and formed from a cross-linked polyurethane-based varnish application containing a dulling agent;

and wherein the leather product undergoes a milling treatment.

2. The leather according to claim 1, wherein said first layer is a pigmented layer, said microspheres have a diameter of substantially between 15 μm and 35 μm, and said second layer is a multi-coating layer.

3. The leather according to claim 1, wherein the hollow microspheres are formed with a thin shell containing a relatively heavy gas therein.

4. The leather according to claim 3, wherein said shell is formed of at least 75% polyvinylidene chloride and less than 25% polyacrylnitrile, and said microspheres contain isobutane in an interior thereof.

5. The leather according to claim 3, wherein said shell of individual said microspheres is opened during a production process by one of mechanical and chemical processing.

6. The leather according to claim 3, wherein said second layer contains a solvent configured to partly dissolve said thin shell of individual said microspheres.

7. The leather according to claim 6, wherein said solvent is selected from the group consisting of ethylacetate and methylethylketone.

8. The leather according to claim 1, wherein said second layer has a thickness of between 0.02 mm and 0.05 mm.

9. The leather according to claim 1, wherein said cowhide has a thickness of between 1.0 mm and 1.4 mm.

10. The leather according to claim 1, wherein said finish is formed to provide the leather with a water vapor permeability of more than $0.6$ mg/cm$^2$·h.

11. The leather according to claim 1, wherein said finish is formed to provide the leather with a water vapor permeability of more than $1.0$ mg/cm$^2$·h.

12. The leather according to claim 1, which further comprises silicon dioxide applied to form a dulling agent.

13. The leather according to claim 12, wherein said silicon dioxide has a particle size of substantially between 2 μm and 4 μm.

14. The leather according to claim 1, wherein at least one of said first and second layers contains a fine wood flour in a quantity between 0.5 and 9% by volume.

15. The leather according to claim 1, wherein at least one of said first and second layers contains a fine wood flour in a quantity between 1.5% and 7% by volume.

16. The leather according to claim 1, wherein said cowhide has a shape of a format cut prior to an application of said first and second layers.

17. A method of producing a full grain napa cowhide, which comprises:

providing cowhide material having a grain side;

providing a first dispersion based on at least one material selected from the group consisting of polyurethane and polyacrylate, the dispersion containing at least one of hollow microspheres with a diameter between 15 μm and 45 μm and compact particles from which the microspheres are formed in situ by heat addition, the microspheres having a thin shell of polyvinylidene chloride and polyacrylnitrile containing a heavy gas;

applying the first dispersion on the grain side of the cowhide, and thereby selecting a quantity of the dispersion such that, after the dispersion is stabilized by dehydration, a first layer with a thickness between 0.015 mm and 0.04 mm is formed, the first layer comprising primarily closed cells formed by the microspheres and at least 10% open cells by volume;

embossing the stabilized first layer with one of pressure and heat processing;

applying a cross-linkable polyurethane dispersion on the first layer to form a second layer; and subjecting the leather to a milling treatment.

18. The method according to claim 17, wherein the first dispersion contains a pigment, and the cross-linkable polyurethane dispersion contains a dulling agent.

19. The method according to claim 17, wherein the heavy gas is isobutane.

20. The method according to claim 17, wherein the step of applying the cross-linkable polyurethane dispersion comprises applying several successive coatings.

21. The method according to claim 17, which comprises at least partly dissolving the thin shells of individual hollow microspheres with a solvent.

22. The method according to claim 21, wherein the solvent is selected from the group consisting of ethylacetate and methylethylketone and the solvent is contained in the second layer.

23. The method according to claim 17, which comprises poking sharps into the first layer to form holes therein and to thereby open the thin shells of individual microspheres.

24. The method according to claim 23, wherein the poking step comprises needling the first layer during the embossing step.

25. The method according to claim 17, wherein the embossing step comprises embossing with an embossing roll at a temperature between 80° C. and 120° C., and maintaining thermal contact between the embossing roll and the first layer for less than 2 seconds.

26. The method according to claim 17, which comprises embossing with a pressure of less than 125 kg/cm$^2$.

27. The method according to claim 26, which comprises embossing with a pressure of less than 90 kg/cm$^2$.

28. The method according to claim 17, which comprises performing the milling treatment after stabilizing the first layer.

29. The method according to claim 17, which comprises performing the milling treatment after stabilizing the second layer.

30. The method according to claim 17, which comprises performing the milling treatment over a period of at least 2 hours.

31. The method according to claim 17, which comprises performing the milling treatment for between 8 and 12 hours.

32. The method according to claim 17, which comprises, prior to an application thereof, adding a quantity of fine wood flour to at least one of the dispersions for forming one of the first and second layers in a quantity between 0.5 and 9% by volume.

33. The method according to claim 32, which comprises adding the fine wood flour in a quantity between 1.5 and 7% by volume.

34. The method according to claim 17, which comprises pretreating the grain side of the cowhide prior to applying the first dispersion for forming the first layer.

35. The method according to claim 34, wherein the pretreating step comprises roughening the grain side of the cowhide.

36. The method according to claim 34, wherein the pretreating step comprises grinding the grain side of the cowhide.

37. The method according to claim 34, which comprises singeing the grain side of the cowhide.

38. The method according to claim 17, which comprises removing format portions from a cowhide skin prior to applying the dispersion forming the finish.

39. The method according to claim 17, which comprises controlling an application of the dispersion forming the finish by way of a storage medium.

* * * * *